(12) United States Patent
Malan et al.

(10) Patent No.: US 12,052,114 B2
(45) Date of Patent: Jul. 30, 2024

(54) SYSTEM AND METHOD FOR DOCUMENTING AND CONTROLLING MEETINGS EMPLOYING BOT

(71) Applicant: Parrot AI, Inc., Acton, MA (US)

(72) Inventors: Gerald R. Malan, Ann Arbor, MI (US); Andrew Mortensen, Ann Arbor, MI (US)

(73) Assignee: PARROT AI, INC., Acton, MA (US)

(*) Notice: Subject to any disclaimer, the term of this patent is extended or adjusted under 35 U.S.C. 154(b) by 0 days.

(21) Appl. No.: 18/201,718

(22) Filed: May 24, 2023

(65) Prior Publication Data

US 2023/0388141 A1  Nov. 30, 2023

Related U.S. Application Data

(60) Provisional application No. 63/345,580, filed on May 25, 2022.

(51) Int. Cl.
*H04L 12/18* (2006.01)

(52) U.S. Cl.
CPC ...... *H04L 12/1831* (2013.01); *H04L 12/1822* (2013.01)

(58) Field of Classification Search
CPC .................. H04L 12/1831; H04L 12/1822
See application file for complete search history.

(56) References Cited

U.S. PATENT DOCUMENTS

| | | | |
|---|---|---|---|
| 9,774,825 B1* | 9/2017 | John | H04L 65/1089 |
| 10,860,985 B2* | 12/2020 | Nelson | G06Q 10/10 |
| 11,423,911 B1* | 8/2022 | Fu | G10L 15/04 |
| 2016/0343374 A1* | 11/2016 | Ogino | H04N 1/00403 |
| 2018/0191907 A1* | 7/2018 | Herrin | H04L 12/1831 |
| 2019/0088153 A1* | 3/2019 | Bader-Natal | H04N 7/147 |
| 2019/0273767 A1* | 9/2019 | Nelson | H04M 7/0027 |
| 2021/0012249 A1* | 1/2021 | Saito | G06Q 10/1095 |
| 2021/0021558 A1* | 1/2021 | Mahmoud | H04L 51/046 |
| 2021/0089860 A1* | 3/2021 | Heere | G06N 20/00 |
| 2023/0046881 A1* | 2/2023 | Mishra | H04L 51/18 |
| 2023/0224180 A1* | 7/2023 | Emoto | H04N 7/155 |
| | | | 709/204 |

* cited by examiner

*Primary Examiner* — Blake J Rubin
(74) *Attorney, Agent, or Firm* — HoustonHogle LLP

(57) ABSTRACT

A media presentation system includes a page editor enabling the embedding of clips into pages for documenting meetings. The media presentation system is represented by a bot that attends the meetings with recording controls being provided in the pages.

16 Claims, 14 Drawing Sheets

SYSTEM AND METHOD FOR DOCUMENTING AND CONTROLLING MEETINGS EMPLOYING BOT

RELATED APPLICATIONS

This application claims the benefit under 35 USC 119(e) of U.S. Provisional Application No. 63/345,580, filed on May 25, 2022, which is incorporated herein by reference in its entirety.

BACKGROUND OF THE INVENTION

Video conferencing uses audio, video, and video and static media streaming to allow users, who are located in different places, to communicate with each other in real time and hold on-line meetings in a variety of contexts, including business, government, education, and personal relationships, to name a few examples. In a typical implementation, audio and/or video capture devices (e.g., microphones and cameras connected to or built into user devices such as desktop computers, laptop computers, smart phones, tablets, mobile phones, and/or telephones) capture audio containing speech of users or groups of users at each location and video visually depicting the users or groups of users. The user devices distribute static images and/or audio/video that is being presented by and for the users. The audio and video data from each location is possibly combined and streamed to other participants of the on-line meetings and can even be recorded and stored (e.g., as a media file) that can later be accessed directly or streamed, for example, to non-participants of the meeting seeking to find out what was discussed or participants of the meeting seeking to engage with the contents of the meeting after the fact.

At the same time, productivity client and cloud-based platforms such as word processing, presentation, publication, and note-taking application programs exist for inputting, editing, formatting, and outputting text and still images. These are increasingly implemented in an online or hybrid online/desktop context (e.g., as a web application presented in a web browser, or as a desktop application or mobile app connected to a cloud-based platform), allowing for sharing and collaboration of the same documents and files between multiple users. Notable examples include Microsoft Word and its related productivity programs included in the Microsoft Office 365 or Teams productivity suite developed by Microsoft Corporation and Google Docs and its related productivity programs included in the G Suite or Google Drive platforms developed by Alphabet Inc. Similarly, hypertext publication platforms such as wikis present, typically in a web browser, text and still images while also allowing collaboration between users in inputting, editing, formatting, and outputting the published content, often using a simplified markup language in combination with hypertext markup language (HTML).

SUMMARY OF THE INVENTION

Recently, a video conferencing and media presentation system has been proposed to allow manipulating and embedding of time-indexed media into documents or pages containing static web content (e.g., text, images). The media presentation part of such a system would ingest and store one copy of media data for recordings (e.g., of events such as on-line meetings, presentations, conferences) and provide short sections of media known as clips that would reference ranges of the tall recording. The media presentation system provides efficient, fine-grained reference and access control for an underlying base of stored time-indexed media data for recordings, including group and individual ownership rights and management schemes along with redaction functionality for users of the stored recordings.

The present video conferencing and media presentation system builds on these previous systems by manifesting the functionality associated with recording control and information distribution and collaboration as a bot that attends meetings like the other participants of the meeting. The video stream and/or images and/or audio associated with and representing the bot-participant are generated by the media presentation system and are preferably dynamic to indicate the current state of the bot-participant and the functionality provided by the media presentation system. For example, video stream and/or images and/or audio representing the bot indicate whether the meeting is currently being recorded or recording has been stopped or paused. This dynamic representation is then served to the video conferencing system for display to the other meeting participants.

One advantage or aspect of this approach is that the video conferencing and media presentation system can be used with third party video conferencing systems such a Google Meet offered by Alphabet Inc, Zoom offered by Zoom Video Communications, Inc, and Microsoft Teams offered by Microsoft Corporation. The system can be video conferencing system agnostic. One of the participants merely needs to invite the bot to the meeting and then interact with the bot to control the video conferencing and media presentation system.

In addition, the video stream or images associated with and representing the bot-participant are scaled by the media presentation system as a function of the number of meeting participants and thus the screen real-estate that is available to display a video stream or images associated with and representing the bot-participant. That is, video streams or images that are distributed by the video conferencing system are generally displayed in a window that contains all of the meeting participants, which are each presented in panes within that larger window. Thus, according to the invention, the scaling of any images and especially text in the video streams or images representing bot-participant is inversely proportionate to the number of participants in the meeting that is the more people, the less real-estate for the bot-participant pane, and thus the larger the font needs to be to be readable for the other participants on their respective displays.

In addition, the bot-participant provides a mechanism, hook or interface for participants to access the real-time control panel for a meeting.

In one example, the meeting participants interact with the media presentation system using the video conferencing application's text-based chat featureset. In a current implementation, the bot-participant provides access to the control panel via the video conferencing system's chat log. That is, the media presentation system provides a link to the control panel via the bot-participant as a chat message. This control panel allows participants to start/stop recording, add participants to the meeting, and document the meeting, etc.

The bot-participant's control panel page also acts as a place to make notes in real-time during the meeting in a collaborative document. The recordings from the meeting are converted into clips and inserted into the page as they complete. And then the meeting participants can add text or other information around these clips as meeting notes, for example.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIGS. 12A and 12B show different bot status graphics served by a bot persona video/image streamer of the media presentation system.

DETAILED DESCRIPTION OF THE PREFERRED EMBODIMENTS

Figure 1A:
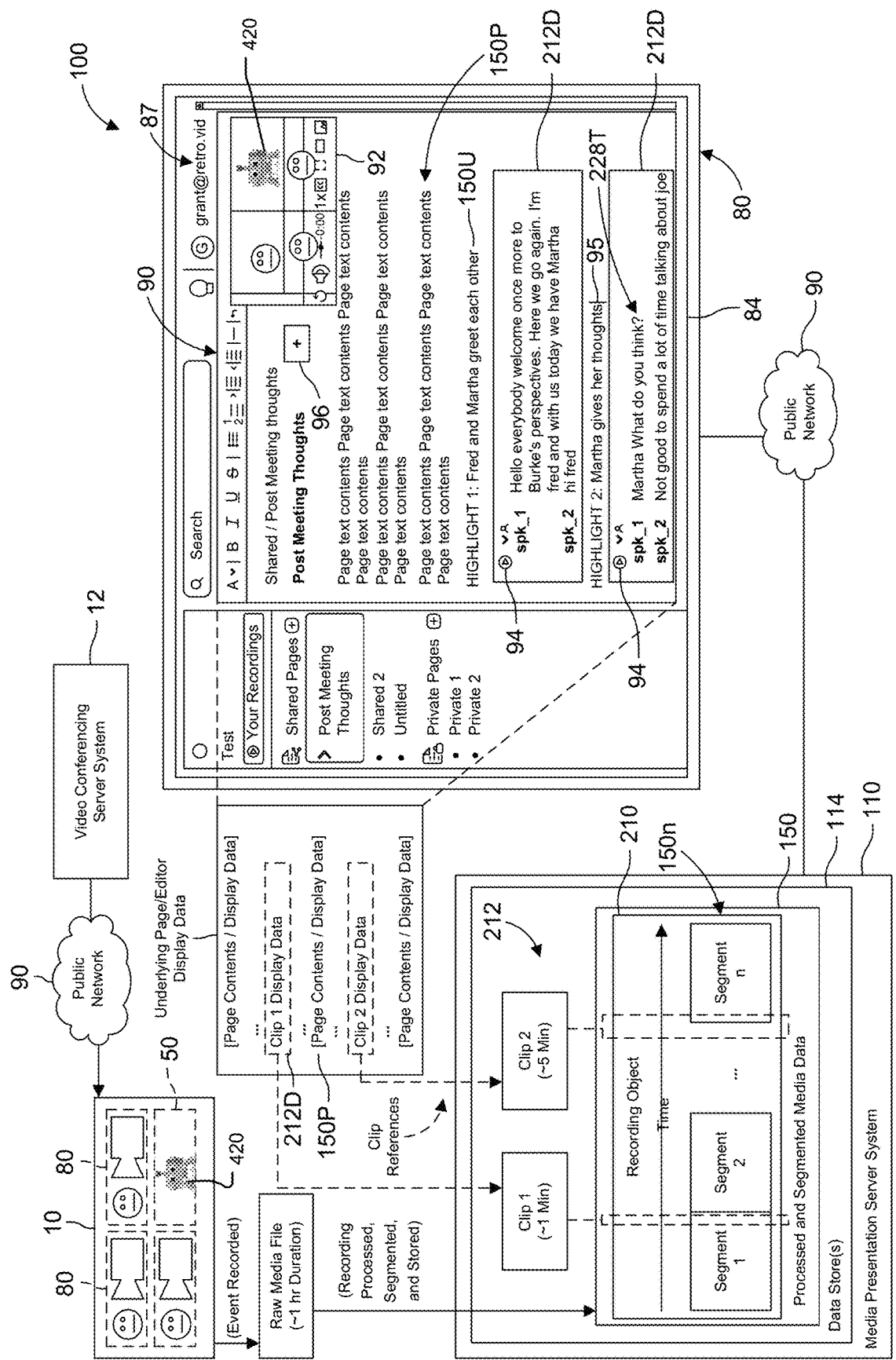
FIG. 1A is schematic diagram of an exemplary media presentation system according to one embodiment of the present invention.

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Also, all conjunctions used are to be understood in the most inclusive sense possible. Thus, the word "or" should be understood as having the definition of a logical "or" rather than that of a logical "exclusive or" unless the context clearly necessitates otherwise. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In general, the present invention relates to a video conferencing and media presentation system 100 for hosting or working with hosted video conferences and generating, presenting, editing, and sharing time-indexed media such as audio and/or video recordings of on-line meetings and other events such as video conference meetings including presentations, conferences, or lectures, which occur in a variety of contexts, including business, government, education, and in personal relationships, to name a few examples. In examples, the video conferencing and media presentation system 100 provides video conferencing and hypertext publication platform and/or productivity platform enabling collaboration by a plurality of users in video conferencing and viewing, inputting, editing, formatting, and outputting user-authored content such as text and still images along with the shared time-indexed media. Background for this system is provided in U.S. patent application Ser. No. 18/056,972, filed on Nov. 18, 2022 and Ser. No. 18/056,978 filed on Nov. 18, 2022, which are incorporated herein by this reference. This further extends the system as described in these previously-filed applications, describing user interfaces and control schemes employed during the video conferences for meetings.

FIG. 1A is schematic diagram of an exemplary video conferencing, productivity and media presentation system 100 according to one embodiment of the present invention.

In one example, the video conference or on-line meeting 10 is hosted by a video conferencing server system 12. As is the case with many presently-available platforms such as Google Meet offered by Alphabet Inc, Zoom offered by Zoom Video Communications, Inc, and Microsoft Teams offered by Microsoft Corporation, the video conferencing server system 12 receives real-time audio and/or video and presentations from the user devices 80 of each of the meeting participants and distributes the audio/video and/or presentations to the user devices of the other participants. The audio/video and/or presentations are displayed on with audio generated by the user devices, often in windows or full screen presentations in which the participants are shown in panes, with other panes being dedicated to shared presentations, often in a screen or presentation sharing arrangement.

Also provided is a productivity and media presentation server system 110. It receives and stores time-indexed media 150 in data store(s) 114. In a common use-case, this time-indexed media is the audio/video/presentations associated with recorded events such as video conference meetings hosted by the video conferencing server system 12. This media presentation system itself is capable of serving documents and streaming the stored time-indexed media to the user devices 80, which present the documents and streaming time-indexed media to users of the user devices via graphical user interfaces 87 rendered on displays 84 of the user devices 80.

Typically, the time-indexed media 150 is a recording of an event such as an on-line, virtual, meeting or video conference 10 but can be any type of audio and/or video data and/or any type of digital media with a temporal dimension of any duration.

In the illustrated example, the event 10 is a virtual or on-line meeting with three different human participants at three different locations conducted using video and/or audio capture devices (e.g., cameras and microphones connected to or included as internal components of user devices 80 such as desktop computers, laptop computers, smart phones, tablets, mobile phones, and/or telephones) deployed at each of the often different locations. Also included is a bot participant 50 that is represented by a bot status graphic 420 generated by the media presentation server system 110. The video and/or audio capture devices capture audio depicting speech of participants or groups of participants at each location and video visually depicting the users or groups of users.

In addition to being served and distributed to be presented in real time to the different participants and/or possibly other participants that are not depicted) on their respective user devices 80 by the video conferencing server system 12, a combined stream of the audio and video data or separate streams from each location/user device are also recorded as raw media files by the media presentation server system 110 or later uploaded to the system 110. These media files of time-indexed data are then combined into documents displayed by page editors 90 that allow for the creation of associated user-authored content 1500 such as plain text, formatted text, still images, tables, charts, bulleted lists, and/or other display elements.

The media presentation server system 110 ingests and processes the audio and/or video streams from each of the users devices directly or indirectly, via the video conferencing server system 12. The media presentation server system 110 records or stores those streams, generally partitioning the meeting's media data 150 into a number of segments 150$n$ (e.g., segmented media files) contained by a recording object 210 representing the full recording (e.g., the entire span of the originally ingested recording). The segmented media data 150 is stored in the data store(s) 114 along with clip data or clip objects 212 representing particular portions of the full recording. The clips 212 include recording references (e.g., start/stop times) delineating the extent of the clips with respect to the full recording object 210 and also specific layers of the recording object. In the current example, the clips 212 refer to the specific segments 150$n$ of the full recording object 210 that the recording was chunked into.

In the illustrated example, the event was represented and displayed on the user devices 80 in real-time as part of the video conference 10. The productivity and media presentation server system 100 also saves and serves a recording of the meeting. A recording object 210 representing this hour-long, for example, recording and containing the many segmented media files 150$n$ for the recording is stored along with two user-defined clip objects 212.

The first clip object "clip 1" represents a portion of the full recording 210 with a duration of approximately one minute and, accordingly, includes a recording reference defining the one-minute span with respect to the duration of the full recording. Similarly, the second clip object "clip 2" represents a portion of the fill recording with a duration of approximately 5 minutes and, accordingly, includes a recording reference defining the five-minute span with respect to the duration of the full recording 210. These respective clips are typically user defined references for the portions of the full recording that were of interest to the users.

In the arbitrary illustrated example, while the underlying stored media data corresponding to the portion of the recording represented by the first clip is entirely contained within one of the segmented media files, the underlying stored media data corresponding to the portion of the recording represented by the second clip spans across more than one of the segmented media files.

In general, the segmented media data 150 generated and maintained by the productivity and media presentation server system 110 is time-indexed media, comprising recording(s) with temporal or time-based dimensions (e.g., corresponding to the duration of the recordings and the duration of the recorded event) and other media content for different points along the temporal dimension. In this way, the time-indexed media data has layers corresponding to the various different types of media content and metadata, such as video, audio, transcript text, translation text, presentation slides, meeting chats, screenshares, metadata, user-specified and/or automatically generated tags, user information (e.g., identifying current speakers and/or participants depicted visually), and/or user-drafted notes, comments, and/or action items associated with different points along the temporal dimension. The layers can further include separate audio and video media streams generated by each of the user devices 80 in the meeting. In general, the layers of the processed and segmented time-indexed media data stack or align with each other along the temporal dimension such that the media content provided on each of the different layers have a common time-index with respect to the same points in time along the temporal dimension.

The time-indexed media data 150 stored by the productivity and media presentation system 100 preferably comprises several layers of different types of time-indexed content (e.g., video, audio, transcript text, translation text, presentation slides, metadata, user-specified and/or automatically generated tags, user information, and/or user-specified notes, comments, automations and/or action items) and/or of similar types (e.g., multiple different video or audio layers). In one example, multiple video layers of the media data are stored, each corresponds to different encodings of essentially the same video media stream. Similarly, multiple audio layers of the media data each correspond to different encodings of essentially the same audio stream. On the other hand, multiple layers of the media data can also each correspond to distinct content streams that are nevertheless indexed and synchronized by the temporal dimension such that the different layers for the different types of content depict the same recorded event, at the same points in time along the duration of the recording, but from different aspects.

For example, the time-indexed media data comprises multiple video or audio layers, each video layer corresponding to streams captured by different video and/or audio capture devices at different locations. Here in this example, one video layer provides media data captured by one video capture device at one location visually depicting one participant, while other video layers provide video content captured by other video capture devices at different locations visually depicting other participants. Still other video layers include video streams depicting a screenshare session that occurred during the recorded event.

The time-indexed media data also usually includes several audio layers corresponding to each of the different video layers providing audio data captured by audio capture devices at the respective locations and depicting the speech of the respective speakers that are often visually depicted in the video layers. Thus, the different video or audio layers are typically associated with particular individuals and the bot 50, and text and/or metadata layers then define an association between the different audio and/or video layers depicting different individuals with different users of the media presentation system.

In other cases, the video and audio of the several participants is a combined audio and video provided by the video conferencing system 12 in which the video of the separate participants is displayed in the different panes of each video frame.

These text and/or metadata layers often also are associated with different users depicted within the same audio and/or video layers by referencing different points of time along the temporal dimension for which the defined associations (e.g., tags) are applicable. The text and/or metadata layers also preferably include time-indexed information concerning user permissions, ownership, and/or access rights specified in permissions data stored by the system, including information associating users with various roles with respect to portions of the recording defined via time information specified for each association indicated in the layer of the media data. In one example, the stored permissions data establishes that users tagged via a text/metadata layer of the media data as having the role of "speaker" with respect to a recording or portions of a recording (such as an individual that is depicted speaking at certain points in the audio and video layers or an individual that is considered a featured speaker for a portion of the recording in which other individuals also are depicted speaking, among other examples) should have edit and/or redaction rights for the portions within which they are tagged as a speaker.

Moreover, in addition to the layers discussed above, the time-indexed media data also typically includes layers for presentation content, including presentation slides showing different slides (e.g., of a PowerPoint slideshow or Slides from a Ci-Suite presentation) that were displayed during the recorded event at different points in time. Here, while one video layer visually depicts a presenter speaking, and one audio layer depicts the speech sounds from that presenter, a presentation slide or screenshare layer include time-indexed content for depicting the different slides (e.g., visually depicting the slides or portions of the slides via image data and/or providing actual text and/or formatting from the slides) or screenshare imagers or video along with timestamps specifying ranges of time for which the slides are applicable (e.g., corresponding to times when the slides were displayed during the event).

In any event, because the dips 212 include the recording references (e.g., start/stop times) delineating the extent of the clips with respect to the duration of the full recording 210 of the on-line meeting, and because the layers of the time-indexed media data stack or align with each other along the temporal dimension such that the content provided on each of the different layers are indicated with respect to the same points in time along the temporal dimension, any clips referencing a portion of the recording can potentially encompass all layers of the time-indexed media data within the time period specified by the clip 212 or a subset of the layers.

In addition to generally presenting streaming media content of the recordings served by the productivity and media presentation server system 110, the user device 80, via the graphical user interface 87 rendered on its display 84, enables users to author content (e.g., static content that is not time-indexed), for example, using the page editor 90 (e.g., word processing web app, wiki platform) for inputting, editing, formatting, and outputting pages 150P containing the user-authored content 150U such as plain text, formatted text, still images, tables, charts, bulleted lists, and/or other display elements. The pages 150P are served by the productivity and media presentation server system 110 to be viewed, created and/or edited by one or more users via the page editors 90 of one or more user devices, particularly via interface elements of the page editor 90 such as a text input box, a text formatting toolbar, and a cursor 95 indicating a current position for any incoming text input received by the user device such as via a keyboard.

Along with the user-authored content 150U, the media presentation system enables users to embed clip data defining referenced portions of time-indexed content from an event (e.g., the recording and its associated time-indexed media data stored in the data store). In one embodiment, the media presentation system includes a user app 85 executing on the user devices 80. This user app 85 renders the graphical user interface (GUI) 87 that includes the meeting page editor that enables the embedding of clip objects 212 representing the referenced portions of the time-indexed recording Objects 210 into user-authorized multimedia documents 150P.

In more detail, the embedded clip objects or clips 212 are displayed by the page editor via clip display elements 212D, which reference content derived from the stored time-indexed media data (e.g., transcript text 228T) pertaining to the referenced portion of the recording, among other examples. These clip display elements 212D are rendered based on underlying page data for the displayed page, which includes the user-authored content itself (e.g., context-specific text entered by users) along with display data indicated via one or more markup languages (e.g., HTML and/or other wiki-related markup languages). Inserted into the underlying page data for the displayed page are clips 212 that are displayed or rendered as clip display elements 212D for rendering the display elements of the embedded clips. The clip display data 212D includes clip references, which are references to relevant clip data 212 and/or portions of the time-indexed media data 210 stored in the data store(s) 114 of the server system 110 (e.g., transcript text 228T within the portion of the recording defined by the recording reference of the clip), In general, when initially loading a page to be displayed, the user device 80 first retrieves the page data 150P for the page to be displayed and then retrieves relevant content derived from the time-indexed media data 210 based on any clip reference data of clip references extracted from the page data.

Clip display elements 212D for embedded pages are generally formatted the same way as the user-authored content 150U of the page 150P, for example, having the same indentation level as any plain text around it and/or the same bullet and indention level appropriate to its position. In the illustrated example, each clip display element 212D includes a clip play button 94 for playing back the referenced clip.

Moreover, embedded clips 212 might have attributes (e.g., indicated in the clip data for the clip) that include which recording it came from, which speakers or participants were active in the clip, as well as other meta-information, all of which can be represented or hidden by the page editor depending on the user's goals (e.g., based on user supplied or inferred display parameters).

The GUI 87 rendered on the display 84 user device 80 also includes a clip player 92, which is a display element for streaming playback of the portions of the time-indexed media data referenced by the embedded clips 212. In one example, the clip player 92 is first hidden and, in response to user selection of the clip play button 94 for an embedded clip, the clip player 92 is displayed overlaid on the page editor 90, and the portion of the recording referenced by the selected embedded clip is streamed and presented.

More specifically, when the user app 85 loads a page served by the productivity and media presentation server system 110, in addition to text-layers (e.g., transcript text) of the media data referenced by any embedded clips, the user app receives a playback descriptor or manifest including a playback token that, in general, grants access only to the referenced portion of the recording by describing ranges of media data the user is allowed to access. The user app stores the playback token and manifest in local memory of the user device and, in response to user selection of the clip play button for an embedded clip, uses the manifest to request the referenced portion of the recording from the productivity and media presentation server system 110 and sends the playback token along with the request. The server system 110 determines whether the requested portion of the recording is authorized based on the playback token and, if so, streams the streaming media to the user device.

In general, the productivity and media presentation server system 110 allows the pages 150P created by one user via the user app and page editor 90 to be shared with other users with a variety of different permissions levels (e.g., view, edit). To this end, the page editor includes a share button 96. In response to user selection of the share button, the user app presents one or more additional interface elements (e.g., popup window with input elements) for receiving additional user selections indicating which users to share and/or which permissions to set for each of the indicated users. Any users granted access to a portion of the recording via an existing clip embedded within a page shared with them by another user (e.g., via the share button of the page editor presenting the page) can, in turn, share that same portion with other users by embedding a new clip based on the existing clip into one of their pages that they then share with others (e.g., via the share button of the page editor presenting the page). When embedding the new clip, the user can narrow the scope (e.g., the extent of the full recording referenced by the clip) of the new clip with respect to the existing clip, for example, by selecting only a portion of the transcript text of the embedded clip, copying the selected portion, and pasting the copied selection into the page editor for a page. However, when embedding a new clip from an existing clip, the user is prevented from expanding the scope beyond what was shared with them originally. For example, the inclusion of only the portion of transcript text pertaining to the embedded clip prevents selection of any portion outside of the displayed portion of the transcript. In one embodiment, an additional verification step is performed by the user app and/or the server system to confirm that any operation creating a new clip from an existing clip does not expand the scope of the new clip with respect to the existing clip.

In general, the productivity and media presentation server system 110 also performs access control functionality at the level of full recordings. The access control and permissions for recordings are based on a group ownership scheme, in which any recording can have one or many owners that have full rights in accessing and modifying the recording. Any owners of a recording can add other owners for the recording (e.g., by selecting other users to add on the GUI) but are prevented from removing owners. In embodiments, the server system 110 initially sets owners of a newly added recording based on which user uploaded or imported the new recording, based on analysis of the new recording, and/or based on integration with a system or service that originally hosted the event depicted in the recording and/or generated the recording. Moreover, in different configurations, owners of recordings can correspond to different functional roles potentially played by users with respect to events and recordings of events, including users who added the recordings (as previously mentioned), users who were present at and/or contributed to the events, and/or users who are depicted in video or audio layers of the recordings, to name a few examples.

The productivity and media presentation server system 110 allows redaction of portions of a recording, for example, based on permissions data and/or predetermined redaction control criteria (e.g., stored on the data store of the server system or in local memory of the user device). According to the permissions data and/or the redaction control criteria, the system allows owners (and only owners) of the recordings to redact the recordings, any owner of a recording can redact the recording, and any recording can be redacted by its owners at any time. In response to receiving a redaction request from the user app indicating a portion of the recording to be redacted, the server system modifies or deletes the media data for the indicated portion of the recording stored in the data store such that the redactions are reflected in any clips referencing the portion of the recording that was redacted. Redactions can include deleting any layer (audio, video, text, or any combination thereof) and/or replacing the deleted layer(s) with blank frames and/or text indicating that the portion of the recording was redacted. In one embodiment, redaction is permanent. For example, in response to receiving a redaction request from the user app, the server system executes the redaction request by destroying or clearing all artifacts of the media data for the redacted portion of the recording from the data store.

Figure 1B:
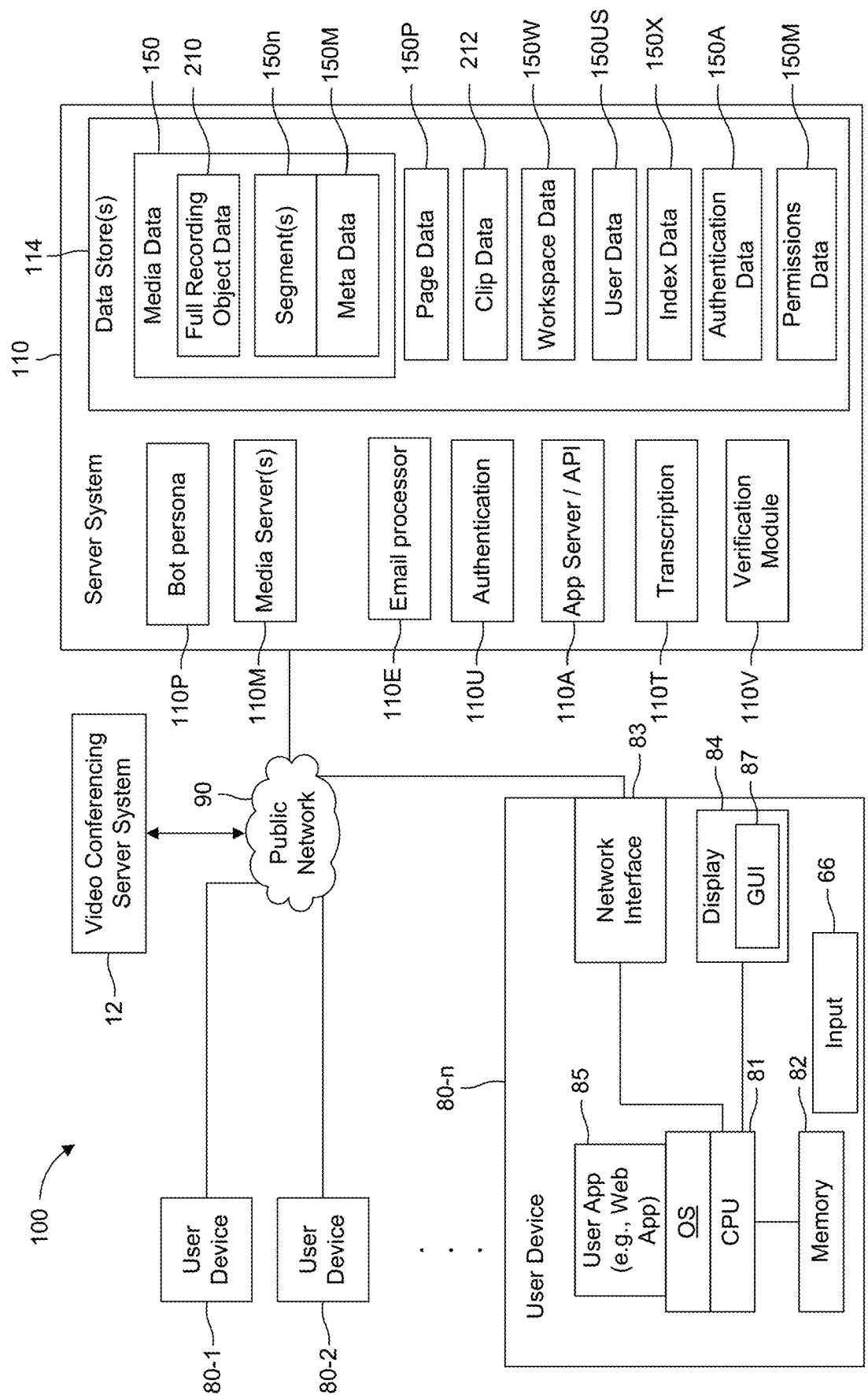
FIG. 1B is a schematic diagram of the media presentation system showing components of the system in additional detail.

FIG. 1B is a schematic diagram of the video conferencing and media presentation system 100 showing components of an exemplary user device 80-n, the video conferencing system 12, and productivity and media presentation server system 110 in additional detail and particularly how the system might be implemented in hardware.

In the illustrated example, a plurality of user devices 80 are connected to the video conferencing system 12 and productivity and media presentation server system 110 via the public network 90, such as the internet.

The media presentation server system 110 includes an application (app) server 110A, one or more media servers 110M, usually an authentication module 1100, a verification module 110V, and one or more data stores 114.

The productivity and media presentation server system 110 and its data store(s) 114 are typically implemented as a cloud system. In some cases, the server system 110 includes one or more dedicated servers having respective central processing units and associated memory. In other examples, they are virtual servers that are implemented on underlying hardware systems. The server system 110 may run on a proprietary or public cloud system, implemented on one of the popular cloud systems operated by vendors such as Alphabet Inc., Amazon, Inc, (AWS), or Microsoft Corporation, or any cloud data storage and compute platforms or data centers, in examples. The server system 110, app server 110A, and/or media server(s) 110M can comprise or use various functions, modules, processes, services, engines, and/or subsystems. These various functions, modules, processes, services, engines, and/or subsystems, including the authentication module 110U and verification module 110V, and/or the app server and/or media server(s) themselves, are generally associated with separate tasks and can be discrete servers, or the separate tasks can be combined with other processes into a unified code base. They can be running on the same server or different servers, virtualized server system, or a distributed computing system. The server system 110 may also be implemented as a container-based system running containers, i.e., software units comprising a subject application packaged together with relevant libraries and dependencies, on clusters of physical and/or virtual machines (e.g., as a Kubernetes cluster or analogous implementation using any suitable containerization platform). Moreover, the user app 85, app server 110A, email processor module 110E, bot persona video/image streamer module 110P, authentication module 1101J, verification module 110V, transcription module 110T and/or media server(s) 110M can utilize or comprise various interacting functions, modules, processes, services, engines, and/or subsystems that are associated with discrete tasks, implemented as services or microservices running on different servers and/or a centralized server of the server system, and accessible by clients (e.g., user app executing on user devices, other services running on the server system).

The data store(s) 114 provide storage for the processed and segmented time-indexed media data 150 along with the clip data 212 for the clip objects, the page data 150P for the different pages (e.g., including references to the clip data and segmented media data), workspace data 150W, user author content 150U, and/or user data 150US used by the user app to present the different pages via the page editor and provide editing, collaboration, and sharing functionality for the different users. In addition, the data stores) store authentication data 150A for verifying user-supplied credentials and generating new login sessions for the users. The data store(s) also store permissions data 150M for controlling access (e.g., reading and/or modifying) by users to pages, workspaces, and/or recordings (including media data). In one embodiment, the data store(s) are provided via a storage service accessed via a web interface, such as S3 provided by Amazon Web Services. In one example, newly ingested recordings are stored as objects in an S3 bucket.

The app server 110A provides an application programming interface (API) and handles requests from the user devices 80 (e.g., via the respective user apps 85 executing on those user devices) to retrieve and/or modify any of the page data 150P, clip data 212, workspace data 150W, user data 150US, and/or index data 150X. The app server 110A also generally handles ingestion processing of new recordings.

The media server(s) 110M receive playback requests from the user apps 85 (along with possibly a playback token for authentication) and, in response, retrieve the time-indexed media data 150 for requested portions of full recordings (e.g., segments, portions of segments) from the data store(s) 114 and return the media data to the user device 80 (e.g., by generating playable media based on the retrieved media data and streaming the playable media to the user device). In one embodiment, the media server(s) 110M and any data stores 114 storing the processed and segmented media data are implemented as a content delivery network (CDN), and the user app directs the playback requests to particular servers at particular addresses indicated in streaming manifests provided by the app server 110A. In embodiments, the media server(s) user protocols, such as MPEG DASH or Apple HLS, are used to create playable pieces and stream them to the client.

In general, the authentication module 110U retrieves the stored permissions data 150M from the data store(s) 114 and generates signed cryptographic tokens identifying users and/or incorporating context-specific permissions data for the identified users. The tokens generated by the authentication module 110U are sent to the user device 80, which stores the tokens in local memory 82. The tokens can include session tokens, which the user device includes with requests to the app server to retrieve and display page data 150P and workspace data or modify data in the data store(s) such as permissions data, to list a few examples. The tokens can also include playback tokens, which the user device includes with playback requests to the media server(s) for streaming media data from the data store(s).

The verification module 110V generally enforces access control with respect to incoming requests for any data stored in the data store(s), including page data 150P, clip data 212, and/or media data based on tokens provided with the requests and/or permissions data 150M stored in the data store(s).

An email processing module 110E receives and parses emails addressed to a domain hosted by the media presentation server system 110. Generally, the email processing module 110E parses received messages including invitations to teleconferencing meetings hosted by the video conferencing server system 12. The meeting is then added to the bot's schedule.

The bot persona video/image streamer 110P of the server system 110 streams images representing the bot to the meetings it attends.

The user devices 80 are generally computing devices operated by users of the media presentation system 100, and the system can accommodate many user devices 80 operated by different users at different times or simultaneously. The user device 80 will typically be a desktop computer, laptop computer, a mobile computing device such as a smartphone, tablet computer, phablet computer (i.e., a mobile device that is typically larger than a smart phone, but smaller than a tablet), smart watch, or specialized media presentation device to list a few examples. Each user device 80 includes a central processing unit 81, memory 82, a network interface 83 for connecting to the public network 90, and a display 84. Executing on the processor 81 is an operating system OS and a user app 85, which generally receives user input (e.g., via input devices 66 such as a keyboard, mouse, and/or touchscreen, among other examples) indicating selections of pages to display via the page editor, changes to the pages, desired playback of recordings and/or clips, and new recordings to be ingested, to name a few examples. The user app 85 also receives from the server system 110 information such as page data 150P including the clip data 212, workspace data 150W, user data 150US, and/or index data 150X for displaying the media data, page contents, the page editor 90, and other interface elements on the display 84 via the graphical user interface 87, which the user app 85 renders on the display 84. In one example, the user app 85 executes within a software program executing on the processor 81 (via the operating system), such as a web browser, and renders specifically a browser user interface within a larger GUI 87 serving the user app 85, web browser, and other applications and services executing on the processor 81 of the user device 80. In another example, the user app 85 executes as a standalone software program executing on the processor 81 (via the operating system) and renders its own GUI 87 (e.g., in one or more windows generated by the standalone software application).

Figure 2:
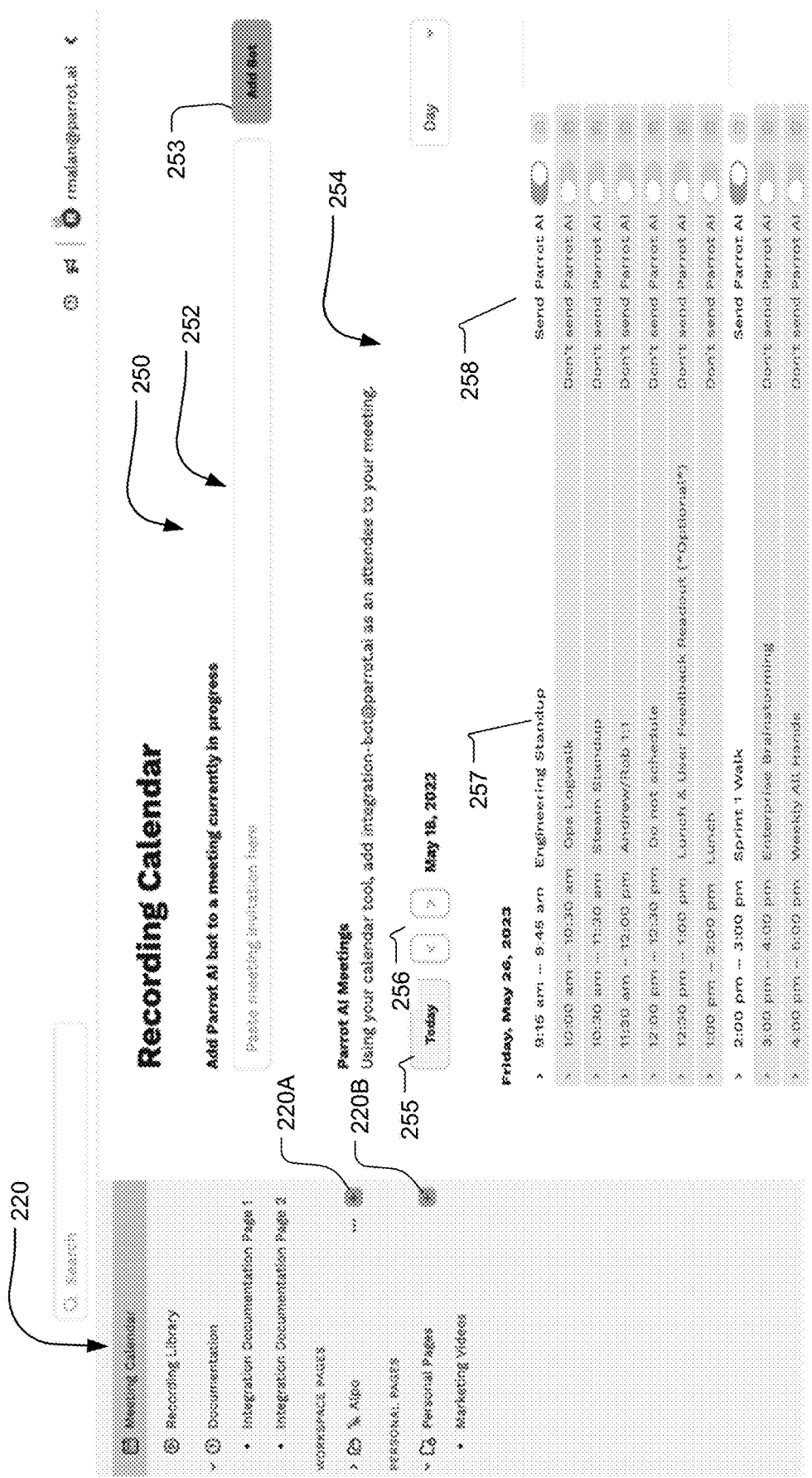
FIG. 2 is a screenshot of an exemplary recording calendar screen of the GUI of the media presentation system.

FIG. 2 is a screenshot of an exemplary recording calendar screen of the GUI 87.

In general, the GUI 87 is rendered by the user app 85 and displayed on the display 84 of the user device 80 and includes a series of screens or views, which comprise graphical elements (such as icons, virtual buttons, menus, textual information) arranged within windows and/or panes that are served by the app server 110A of the server system 110. In response to detecting input from the user indicating interaction by the user with the graphical elements, the user app 85 receives input indicating selection of various options or functions represented by the graphical elements.

More particularly, the illustrated recording calendar screen of the GUI comprises a page navigation pane 220 and a recording calendar pane 250.

The page navigation pane 220 includes a selectable page directory arranged in a hierarchical fashion allowing nested groups of pages to be expanded (e.g., revealed) or collapsed (e.g., hidden) in a shared pages section or a private pages section. The page navigation pane also includes add shared pages buttons 220A and add private pages button 220B, which, at the root level, are always displayed but at other levels of the hierarchy are only displayed when one of the pages indicated in the hierarchy is currently selected or hovered over (e.g., via a pointer of a mouse device).

The recording calendar pane 250 features an add bot link current meeting text box 252. In its typical use, the user pastes a link such as a meeting link or invitation link to an in-session meeting that the user wants the bot to attend. Such meeting links are generated by typical teleconferencing systems as a way of providing users with selectable links so that they may enter a specific online meeting designated by the link. Once the user has pasted that link, the add bot button 253 is selected by the user. This pushes the meeting designated by the link into the bot's calendar.

On the other hand, the recording calendar pane 250 also features a calendar list 254 portion listing meetings to which the bot has been previously invited to attend. In the calendar list portion, the meetings are arranged in increasing time descending down the page. The user selects different days by using the Today button 255, and forward/back buttons 256.

The calendar list 254 shows the date and time of the meetings on the bot's recording calendar. There is also a column for the title of the meeting 257 and a column for toggles to choose whether to send the bot to the meeting.

Figures 3, 4:
FIG. 3 is a screenshot of the GUI of the media presentation system showing the add bot link text box with a link associated with a meeting hosted by the Zoom video conferencing service.
FIG. 4 is a screenshot of the GUI of the media presentation system showing the meeting page editor screen of the GUI.

FIG. 3 shows the add bot link current meeting text box 252 with a link associated with a meeting hosted by Zoom video conferencing service. By selecting the add bot button 253, the meeting designated by the link gets pushed into the calendar and the bot enters the meeting.

FIG. 4 is a screenshot of the meeting page editor screen 90 of the GUT 87 when a particular meeting has been selected from the list displayed in the calendar list portion 254. It shows the date and time of the meeting 260. Also shown is the meeting status 263 and a link to the meeting 264. In the illustrated example, the meeting had been joined by the user.

When the meeting page editor screen is served by the app server 1110A of the server system 110 during an active meeting, a bot status graphic 420 is shown in the right side. This graphic in the illustrated example is a static graphic indicating the current status of the bot and by extension the productivity and media presentation server system 110. The particular graphic indicates that the bot and thus the media presentation server system 110 is currently not recording the indicated meeting.

Finally, also on the right side are the controls for the bot including a start button 266 and a stop button 267 for starting and stopping, respectively, the recording function of the bot/media presentation server system 110.

The meeting link is a link to a page with the meeting details from the meeting invitation. This information can include calendar invite information like meeting agenda, invitees, etc. In this example, just the zoom meeting link is shown since it was a dynamic meeting (ongoing and not scheduled).

This page editor screen page is dynamic, whereas meeting recordings are stopped and started, the media data appear as embedded clips like other pages in the system. Moreover, the entire page is collaboratively editable by the app server 110A of the server system 110 so that during the meeting real-time notes can be added.

This page also shows all of the system users that will be owners of the meeting page and recordings after the meeting has ended.

Figure 5:
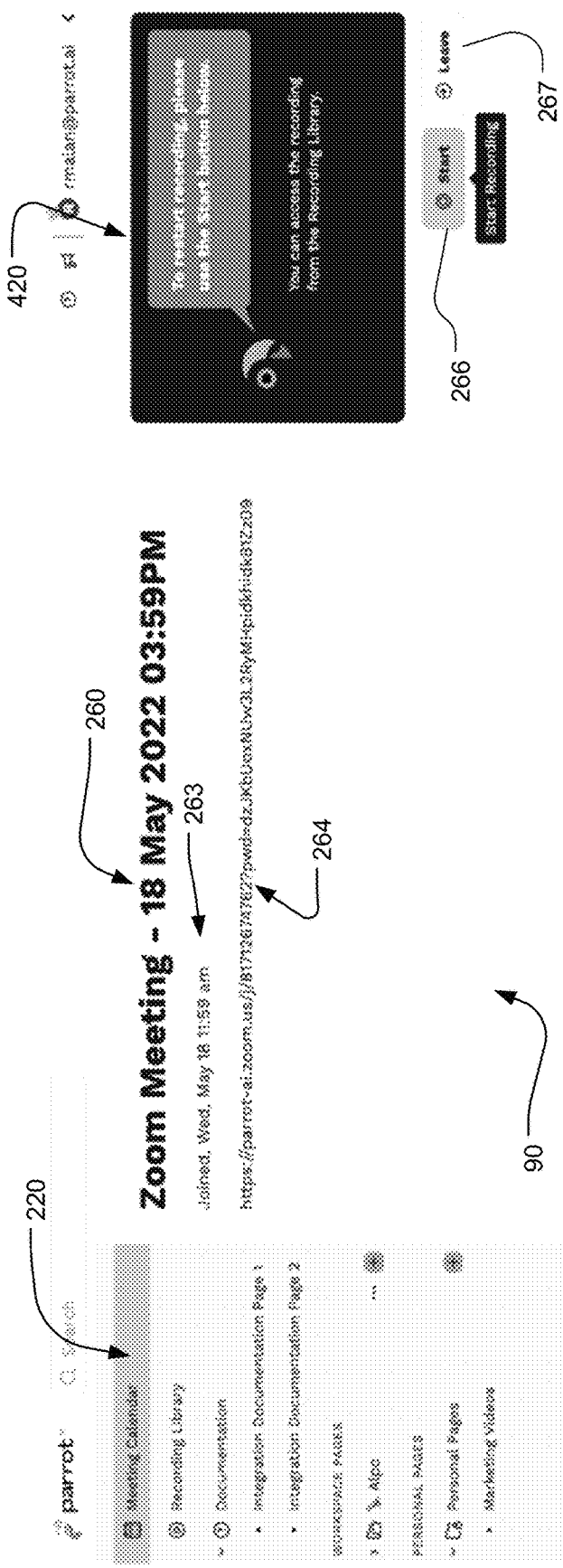
FIG. 5 is another screenshot of the GUI of the media presentation system showing the meeting page editor screen of the GUI.

FIG. 5 is a screenshot of the page editor screen of the GUI when the user's pointer is hovering over the start button 266 showing the "Start Recording" tooltip message.

Figure 6:
FIG. 6 is another screenshot of the GUI of the media presentation system showing the meeting page editor screen of the GUI.

FIG. 6 is a screenshot of the page editor screen of the GUI when the user's pointer is hovering over the leave button 267 showing the "Remove Bot" tooltip message. The remove bot functionality allows any system user to send the bot away from the meeting.

Figure 7A:
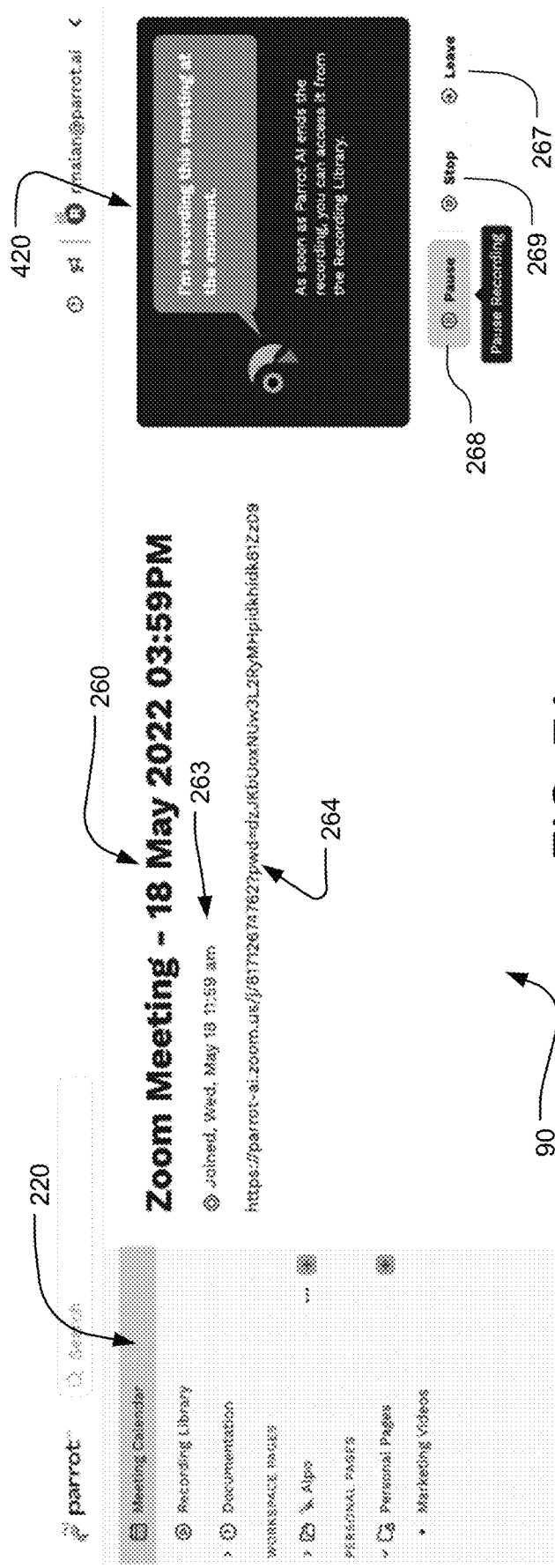
FIG. 7A is another screenshot of the GUI of the media presentation system showing the meeting page editor screen of the GUI.

FIG. 7A is a screenshot of the page editor screen 90 of the GUI 87 when the bot status graphic 420 indicates that the bot and thus the media presentation server system 110 is currently recording the meeting indicated by subject meeting. The bot status graphic served by the app server 110A of the server system 110 now includes the text "I'm recording this meeting at the moment."

When in this recording state, the bot controls include pause 268, stop 269 and leave 267 buttons. Any user that has added the bot to represent them at the meeting have these controls on their ongoing meeting page.

Figure 7B:
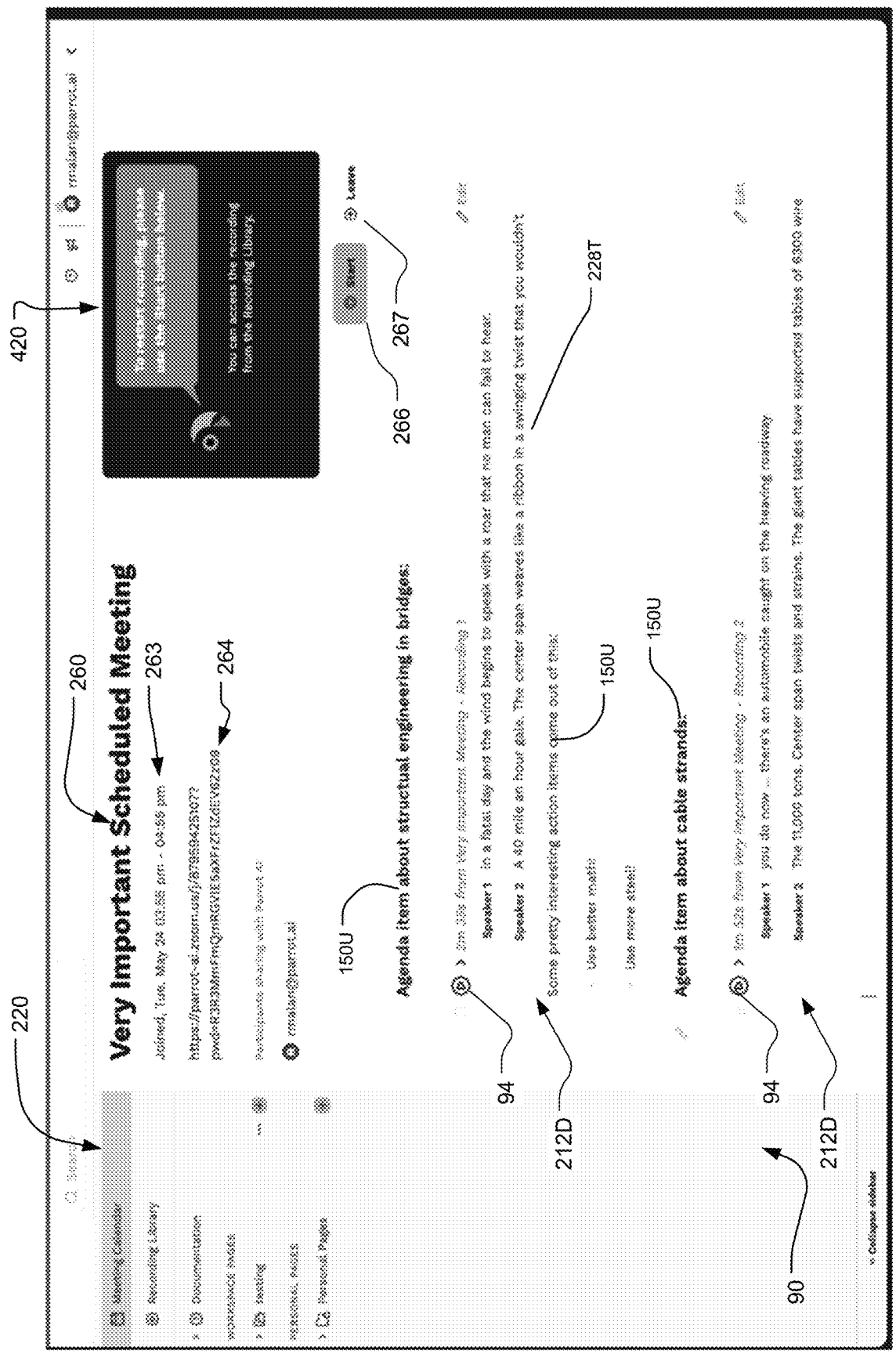
FIG. 7B is still another screenshot of the GUI of the media presentation system showing the meeting page editor screen of the GUI showing a meeting participant list, various textual information added by the participant(s), clips from the meeting, user-added text associated with the different clips.

FIG. 7B is still another screenshot of the GUI of the media presentation system showing the page editor screen of the GUI for an ongoing meeting served by the app server 110A of the server system 110. The system generates a list of the registered participants besides the bot and provides that list as a meeting participant list.

Also shown is exemplary meeting documentation. There is user added text 150U interspersed with user defined clip display elements 212D from the meeting and system-generated transcript text 228T associated with the clips.

Figure 8:
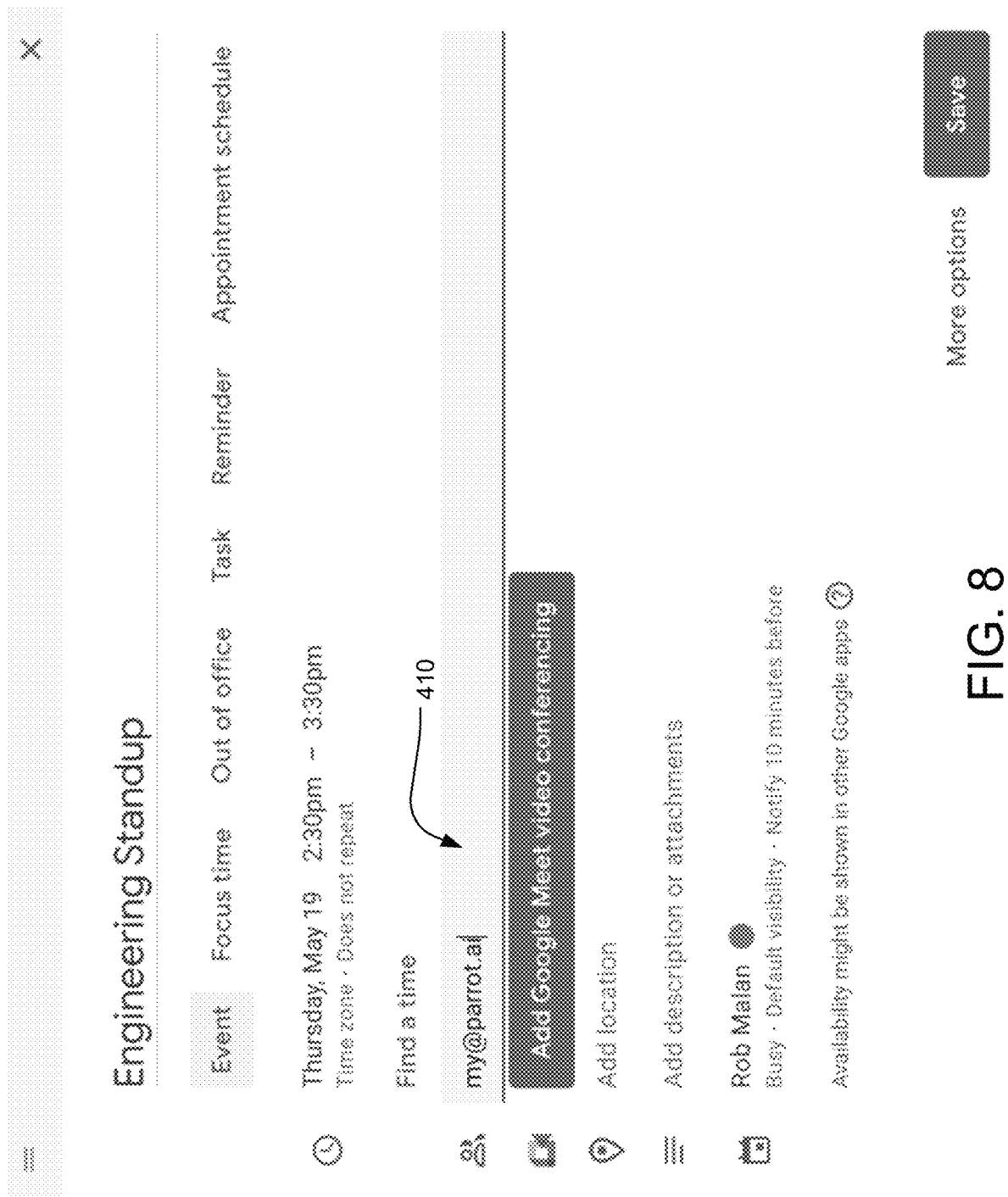
FIG. 8 is a screenshot of a GUI of teleconferencing system for creating a video conference meeting and specifically adding the bot to the meeting.

FIG. 8 shows a screen shot of a teleconference meeting creation screen for a Google Meet video conference meeting. It illustrates one mechanism for adding the bot and thus the media presentation server system 110 and allowing this system to monitor and record Google Meet meetings. Specifically, an email address associated with the media presentation server system 110 is added in the participant invite text box 410. The resulting email generated by the calendaring system or video conferencing system 12 is received by the media presentation server and handled by the email processor 110E. The email processor parses the email and obtain the details of the meeting such as the time, link, source of the invitation from the video conferencing system 12 (Google Meet in the illustrate example) and then adds the invited meeting to the bot's schedule.

Each user in the system has their own meeting calendar (labeled recording calendar in these screenshots). When a calendar system adds an invite it sends an .ics message via email to all of the participants from the person that modifies/adds the calendar entry. The system watches and parses all of these incoming .ics messages from calendar systems, such as Google Cal or Outlook, and if the originator (sender) or any attendees of the meeting are registered users in the system—it updates their meeting calendar with the appropriate invite.

The system has a bot scheduler that runs continuously to fire up a bot for any meeting that any users want to attend, and joins that meeting.

Figure 9:
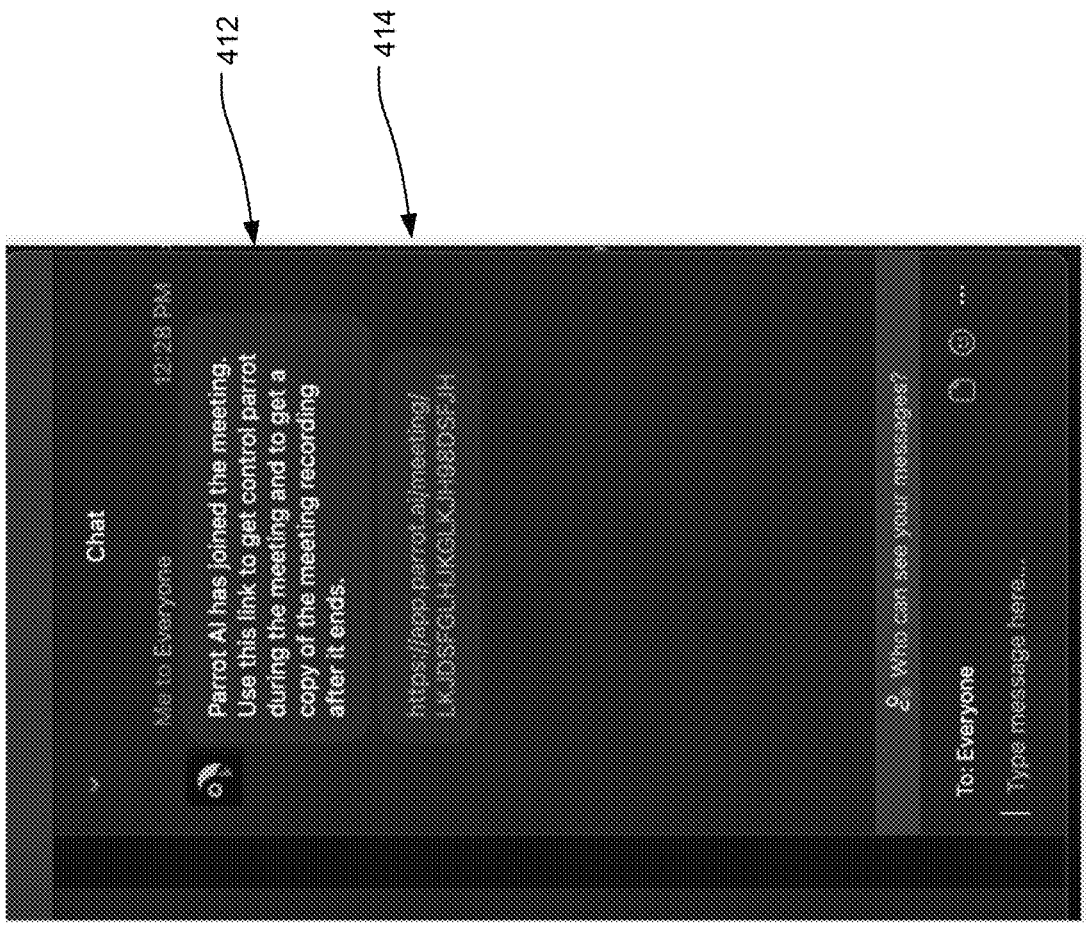
FIG. 9 is a screenshot of a GUI of a meeting chat function of the teleconferencing system.

FIG. 9 shows a screen shot of a teleconference meeting chat function. In typically operation, the bot announces itself to the meeting participants by sending a message 412 to the participants via the meeting's chat log of the video conferencing system 12. The bot also sends a message containing a link 414 to the meeting page editor screen for the meeting. This way the participants can collaboratively edit the meeting's page as shown in FIG. 713, for example, By adding notes and other information, the participants can collaboratively document the meeting hosted by the video conferencing system 12 while also sharing in the control of the bot/media presentation server system 110.

Providing this link in the chat log allows new users to join the system and get access to the meeting and its recordings. If a new user clicks on the link, they create a new account in the system and they are dropped into the ongoing meeting page. They will also get a copy of the meeting page and any related recordings and are designated as meeting participants. This way, the system allows any participant to have access to the page editor screen.

Figure 10:
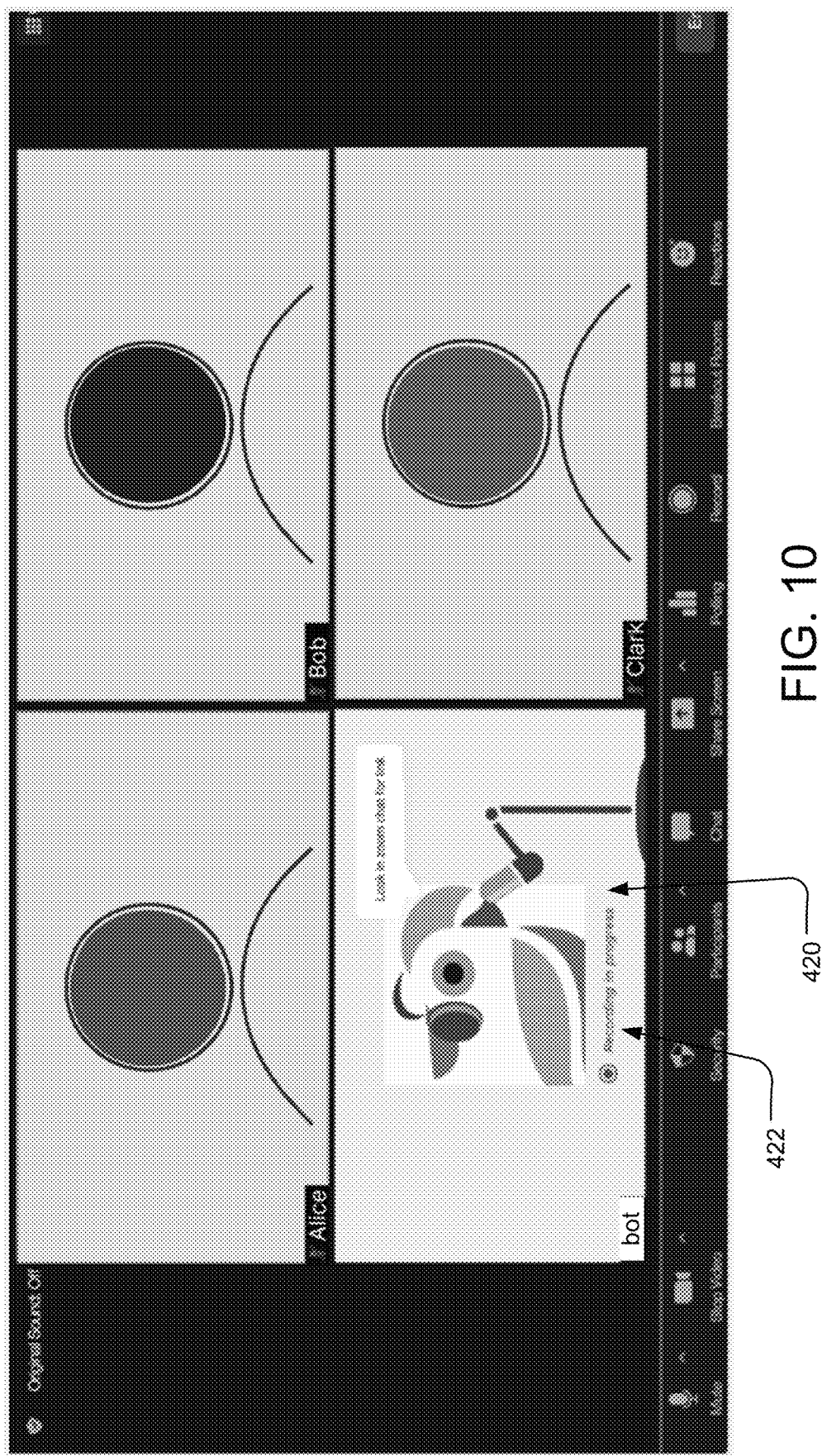
FIG. 10 is a schematic screenshot of a GUI of teleconference meeting hosted by the teleconferencing system in which the bot is participating.

FIG. 10 is a screen shot of a teleconferencing meeting hosted by the video conferencing server system 12. The media presentation server system 110 interacts with the video conferencing server system 12 by providing a video or image stream to represent the bot in the teleconferencing meeting. This functionality is provided by the bot persona video/image streamer 110P of the server system 110. In the current example, the bot persona video/image streamer 110P streams the same graphic as the bot status graphic 420 shown on the page editor screen for the meeting. This bot status graphic is displayed as if it were a meeting participant. This gives the actual meeting participants the current status of the bot as stated by the bot status text 422 and whether or not the media presentation server system 110 is currently recording the meeting.

In other embodiments, there are more interactive features to the bot. These include: a dynamic animation of the graphic 420 that represents both 1) the passage of time, 2) the actions of users in the meeting, and 3) sounds and noises that can alert to status changes.

Figure 11:
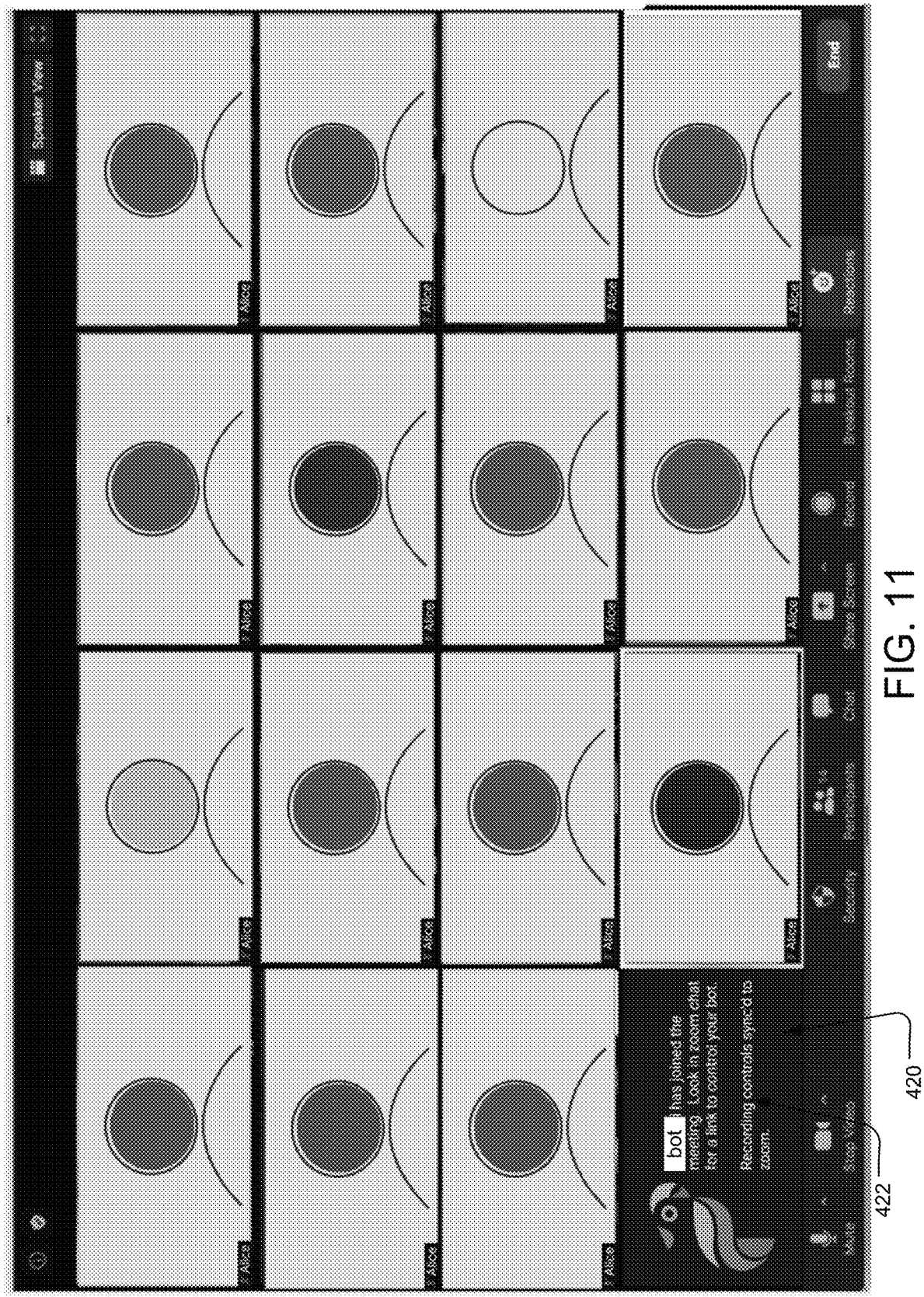
FIG. 11 is another schematic screenshot of a GUI of teleconference meeting hosted by the teleconferencing system.

FIG. 11 is a screen shot of a teleconferencing meeting hosted by the video conferencing server system 12. In this example, there are 16 meeting participants in addition to the bot meeting participant as indicated by the bot status graphic 420 provided by the bot persona video/image streamer 110P of the productivity and media presentation server system 1110.

Comparing FIGS. 10 and 11 shows important feature. The media presentation server system 110 sizes the bot status text 422. The font size of the bot status text provided by the bot persona video/image streamer of the media presentation server system 110 is sized based on the number of participants in the meeting. As the number of participants in the meeting increases, the screen real estate available to the bot status graphic 420 in the teleconferencing meeting graphic decreases. To ensure that the bot's status is still legible, the bot persona video/image streamer increases the font size with increasing numbers of participants to ensure legibility. On the other hand, in the current example, the bird graphic representing the bot is reduced in size since it is less information bearing and to accommodate the larger text.

The link sharing ownership paradigm is a way to control access to documents and files by ensuring that only authorized users can access them through shared links. In the context of virtual meetings, this paradigm can be extended by incorporating a QR code into the bot status graphic 420 generated and served by the bot persona video/image streamer 110P of the server system 110.

By including a unique QR code in the bot status graphic 420, the other participants can easily scan that code to gain access to the meeting documents and files. This provides a secure and efficient way to control access to meeting materials and ensures that only authorized participants can access them. The QR code can represent a token that is specific to each meeting and is generated dynamically for added security.

The use of QR code simplifies the sharing process. Instead of sharing links manually, participants can simply scan the code to access the meeting materials. This can save time and reduce errors associated with manual link sharing.

In addition to improving the security and efficiency of the sharing process, the use of QR codes within the bot status graphic 420 can also enable more granular control over media access and interactions within online meetings. By scanning the QR code with their mobile device, meeting attendees can gain access to a customized interface for managing their permissions and interactions with the media presentation system. This interface can include features such as real-time interactivity with the attendee, allowing users to ask questions and get background information about the meeting and the organization.

Overall, the use of QR codes within the bot status graphic 420 represents a powerful extension of the link sharing ownership paradigm, allowing for more granular and sophisticated control over media access and interactions within online meetings. As such, it significantly enhanced the functionality and usability of the media presentation system 110 for organizations of all sizes and types.

In other examples, the bot status graphic 420 and its associated text 422 further represents the names of users who have added themselves as owners of the meeting and have invited the media presentation server system 110 to the meeting. This feature provides several benefits that enhance the user experience and facilitate better communication and collaboration among meeting participants.

One of the primary advantages of this feature is that it provides participants with an intuitive way of identifying the owners of the meeting and the users who have sent the media presentation server system 110 to attend the meeting. In large meetings, it is good to know which attendees are asking to record the meeting. It may be someone that is synchronously in the meeting, or someone that could not be there live, but is a stakeholder that will participate asynchronously after the meeting is over.

Modifying the meeting image to reflect who it represents is a way to instill trust and accountability for recording artifacts, and the scope of use and sharing within teams and meeting participants.

FIG. 12A shows another example of the bot status graphic 420.

It includes dynamic status text that changes between "paused" and "recording" to indicate whether the media presentation server system 110 has been paused in its recording or is currently recording the meeting.

The bot status graphic 420 further includes a QR code 426 that provides a link to the page editor screen 90 of the GUI 87 of the media presentation server system 110 for the current meeting.

Figure 12B:

FIG. 12B shows another example of the bot status graphic 420. Here, the bot status text 422 indicates the individual, "Logan Roy," that invited the media presentation server system 110 to the meeting.

The meeting image can be further customized to include more or less information and decoration. Some settings and participants may want to have their brand represented in the image, while others will want nothing but a black background with minimal text.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for documenting meetings, the method comprising:
   providing a bot of a meeting documentation system that is invited to and/or attends on-line meetings;
   the meeting documentation system recording and/or providing access to time-indexed content from the meetings attended by the bot; and
   providing bot video streams or images that represent the bot that change based on status of the meeting documentation system,
   wherein the meeting documentation system works with third-party video conferencing systems by inviting the bot to participate in meetings being hosted on these third-party video conferencing systems.

2. The method of claim 1, further comprising providing bot video streams or images that represent the bot in the on-line meetings.

3. The method of claim 1, further comprising providing meeting chat messages from the bot to other participants in the meeting.

4. The method of claim 1, wherein the bot video streams or images change to indicate whether the meeting documentation system is recording the meetings or recordings are paused.

5. The method of claim 1, further comprising providing bot video streams or images that change based on numbers of participants in the meetings.

6. The method of claim 1, further comprising providing bot video streams or images that include machine readable symbols that provide links to pages for documenting the meetings.

7. The method of claim 6, wherein the machine readable symbols include QR codes.

8. The method of claim 1, further comprising providing meeting documentation pages that also include the bot video streams or images.

9. The method of claim 8, wherein the meeting documentation pages include recording controls for the on-line meeting.

10. The method of claim 1, wherein the meeting documentation system generates an add bot link current meeting text box to receive a link associated with the on-line meetings and/or processes .ICS messages to add the bot to a meeting specified by the messages.

11. A meeting documentation system, comprising:
   a bot streamer module providing a bot that attends on-line meetings including providing bot video streams or images that represent the bot that change based on status of the meeting documentation system; and
   an application server providing meetings pages providing access to time-indexed content from the meetings attended by the bot,
   wherein the meeting documentation system works with third-party video conferencing systems by inviting the bot to participate in meetings being hosted on these third-party video conferencing systems.

12. The system of claim 11, wherein the application server provides meeting documentation pages that also include bot video streams or images.

13. The system of claim 11, wherein the bot streamer module provides meeting documentation pages that also include the bot video streams or images.

14. The system of claim 11, wherein the bot streamer module provides bot video streams or images that include machine readable symbols that provide links to pages for documenting the meetings.

15. The system of claim 14, wherein the machine readable symbols include QR codes.

16. The system of claim 11, wherein the meeting documentation system generates an add bot link current meeting text box to receive a link associated with the on-line meetings and/or processes .ICS messages to add the bot to a meeting specified by the messages.

\* \* \* \* \*